United States Patent
Heeter

(10) Patent No.: US 11,725,525 B2
(45) Date of Patent: Aug. 15, 2023

(54) ENGINE SECTION STATOR VANE ASSEMBLY WITH BAND STIFFNESS FEATURES FOR TURBINE ENGINES

(71) Applicant: Rolls-Royce North American Technologies Inc., Indianapolis, IN (US)

(72) Inventor: Robert W. Heeter, Noblesville, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 17/578,885

(22) Filed: Jan. 19, 2022

(65) Prior Publication Data
US 2023/0228200 A1     Jul. 20, 2023

(51) Int. Cl.
F01D 9/04     (2006.01)

(52) U.S. Cl.
CPC ........ F01D 9/041 (2013.01); *F05D 2240/121* (2013.01); *F05D 2300/501* (2013.01)

(58) Field of Classification Search
CPC ............................ F01D 9/041; F05D 2240/121
See application file for complete search history.

(56) References Cited

U.S. PATENT DOCUMENTS

| | | | |
|---|---|---|---|
| 3,335,483 A * | 8/1967 | Werner | F01D 9/042 29/889.22 |
| 4,920,742 A * | 5/1990 | Nash | F01D 25/162 415/134 |
| 7,399,163 B2 * | 7/2008 | Bil | F01D 5/147 416/193 A |
| 8,596,965 B2 | 12/2013 | Merry et al. | |
| 8,966,756 B2 | 3/2015 | Feigleson et al. | |
| 9,291,064 B2 | 3/2016 | Feulner et al. | |
| 9,303,520 B2 | 4/2016 | Hasting et al. | |
| 9,920,633 B2 | 3/2018 | Bergman et al. | |
| 9,970,320 B2 * | 5/2018 | De Sousa | F01D 25/243 |
| 10,408,227 B2 | 9/2019 | Bailey et al. | |
| 10,450,867 B2 | 10/2019 | Bunker | |
| 10,533,456 B2 | 1/2020 | Barainca et al. | |
| 10,619,498 B2 | 4/2020 | Simonds et al. | |
| 11,066,959 B2 | 7/2021 | Swift | |
| 2012/0082556 A1 * | 4/2012 | Macchia | F01D 25/162 427/256 |
| 2013/0315708 A1 * | 11/2013 | Rendon | F01D 11/005 415/110 |
| 2014/0255203 A1 * | 9/2014 | Roby | B64C 27/54 416/245 R |
| 2016/0108754 A1 * | 4/2016 | Herbaut | F01D 9/041 415/121.3 |

(Continued)

*Primary Examiner* — Brian Christopher Delrue
(74) *Attorney, Agent, or Firm* — Barnes & Thornburg LLP

(57) ABSTRACT

An engine section stator for a gas turbine engine having a compressor, a combustor, and a turbine. The engine section stator includes an inner band, an outer band spaced radially outwardly from the inner band, and a series of spaced apart aerofoils extending the inner and outer bands. The engine section stator includes a stiffness feature that extends away from one of the inner and outer bands of the engine section stator. The stiffness feature configured to increase the high cycle fatigue strength of the aerofoils without impeding airflow passing between the inner and outer bands.

19 Claims, 6 Drawing Sheets

(56) References Cited

U.S. PATENT DOCUMENTS

| | | | |
|---|---|---|---|
| 2017/0321604 A1* | 11/2017 | Lourit | F02C 7/047 |
| 2017/0335700 A1* | 11/2017 | Bergman | F01D 9/041 |
| 2018/0112596 A1* | 4/2018 | Vriendt | F01D 25/02 |
| 2019/0017387 A1* | 1/2019 | Hall | F01D 5/3023 |
| 2019/0078536 A1 | 3/2019 | Iwrey | |
| 2019/0390600 A1* | 12/2019 | Ganiger | H05B 6/10 |
| 2020/0040748 A1* | 2/2020 | Gimat | F01D 9/041 |
| 2020/0400081 A1 | 12/2020 | Bemment et al. | |
| 2021/0131289 A1* | 5/2021 | Whitaker | F01D 5/186 |

* cited by examiner

ENGINE SECTION STATOR VANE ASSEMBLY WITH BAND STIFFNESS FEATURES FOR TURBINE ENGINES

STATEMENT REGARDING FEDERALLY SPONSORED RESEARCH OR DEVELOPMENT

Embodiments of the present disclosure were made with government support under Contract No. FA8650-19-F-2078. The government may have certain rights.

FIELD OF THE DISCLOSURE

The present disclosure relates generally to a gas turbine engine, and more specifically to a core vane assembly or engine section stator (ESS) located between the fan rotor and the duct leading to the compressor in a turbofan.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

An engine section stator (ESS) may be a non-structural component positioned between the fan rotor and the duct leading to the compressor in a turbofan. The engine section stator can be milled from an aluminum or titanium forging or brazed together from several components, or could be additively manufactured. Efficient aerodynamic designs may use thin aerofoils with small fillets, while high cycle fatigue capability can be challenging to meet on such a design. Typically, the aerodynamic definition may be compromised to improve stress and high cycle fatigue endurance of the aerofoils to meet manufacturing specifications.

SUMMARY

The present disclosure may comprise one or more of the following features and combinations thereof.

An engine section stator of a gas turbine engine may include one or more stiffness features to increase the strength of portions of the engine section stator without impeding airflow.

In some embodiments, the engine section stator includes an inner band, an outer band spaced radially outwardly from the inner band, and a series of spaced apart aerofoils extending between the inner and outer bands. The engine section stator includes stiffness features located proximate the aerofoils.

According to another aspect of the present disclosure, the stiffening features may include a first stiffness feature located proximate the leading edge of the aerofoils. The first stiffness feature extends radially outwardly from the outer band and can be in the form of a continuous hoop or segments aligned with each aerofoil.

In some embodiments, the engine section stator includes a second stiffness feature that is proximate the trailing edge of the aerofoils and extends radially outwardly from the inner band. The second stiffness feature can be in the form of a continuous hoop or segments aligned with each aerofoil.

In some embodiments, the engine section stator may include a third stiffness feature that is proximate the trailing edge of the aerofoils. The third stiffness feature extends radially outwardly from the outer band. The stiffness features are configured to increase the high cycle fatigue strength in aerofoils without impeding airflow passing between the inner and outer bands.

These and other features of the present disclosure will become more apparent from the following description of the illustrative embodiments.

DETAILED DESCRIPTION OF THE DRAWINGS

Figure 1:
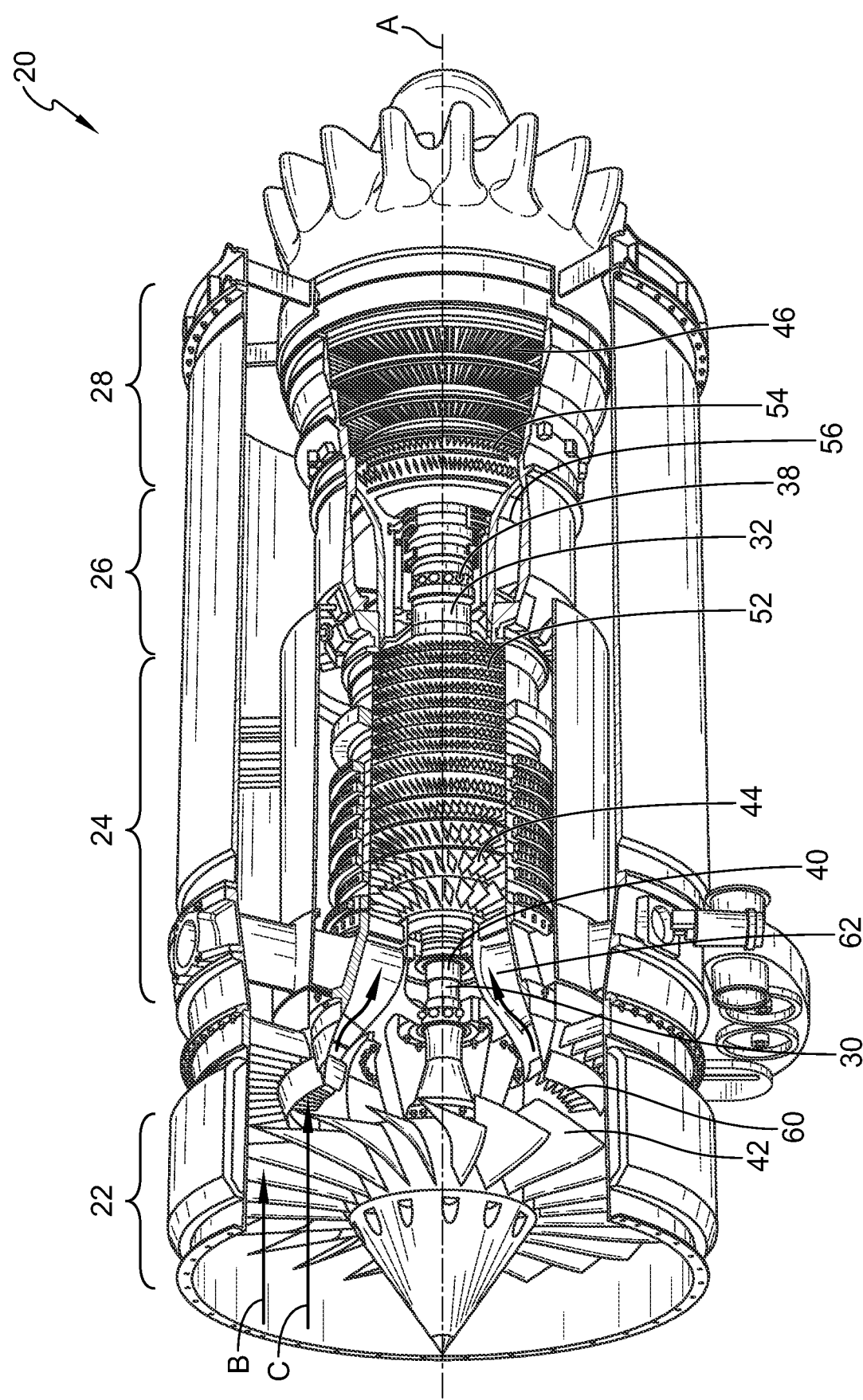
FIG. 1 is a schematic cut away view of a gas turbine engine embodiment.

For the purposes of promoting an understanding of the principles of the disclosure, reference will now be made to a number of illustrative embodiments illustrated in the drawings and specific language will be used to describe the same.

FIG. 1 illustrates an example gas turbine engine 20 that includes a fan section 22, a compressor section 24, a combustor section 26 and a turbine section 28. The fan section 22 drives air along a bypass flow path B while the compressor section 24 draws air in along a core flow path C where air is compressed and communicated to a combustor section 26. In combustor section 26, air is mixed with fuel and ignited to generate a high pressure exhaust gas stream that expands through turbine section 28 where energy is extracted and utilized to drive fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The principles may also be used for other vanes of a gas turbine engine.

The example engine 20 generally includes a low speed spool 30 and a high speed spool 32 mounted for rotation about an engine central longitudinal axis A relative to an engine static structure via several bearing systems 38. It should be understood that various bearing systems 38 at various locations may alternatively or additionally be provided.

The low speed spool 30 generally includes an inner shaft 40 that connects a fan 42 or a low pressure (or first) compressor section to a low pressure (or first) turbine section 46. The high-speed spool 32 includes an outer shaft that interconnects a high pressure (or second) compressor section 52 and a high pressure (or second) turbine section 54. The inner shaft 40 and the outer shaft are concentric and rotate via the bearing systems 38 about the engine central longitudinal axis A.

A combustor 56 is arranged between the high pressure compressor 52 and the high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The core airflow C is compressed, mixed with fuel and ignited in the combustor 56 to produce high speed exhaust gases that are then expanded through high pressure turbine 54 and low pressure turbine 46. Core airflow C first passes through a core vane assembly or engine section stator (ESS) 60. Engine section stator 60 is a non-structural component of engine 20 and is located between fan 42 and duct 62 leading to compressor 52 in engine 20.

For efficient designs for engine section stators 60, it may be desirable to use thin aerofoils 84 with small fillets. However, thin aerofoils can cause issues with high cycle fatigue (HCF). High cycle fatigue is a type of metal fatigue caused by alternating stresses in the elastic range. Fatigue cracks start after long periods of use such as hundreds of thousands or millions of cycles for example.

Figure 2:
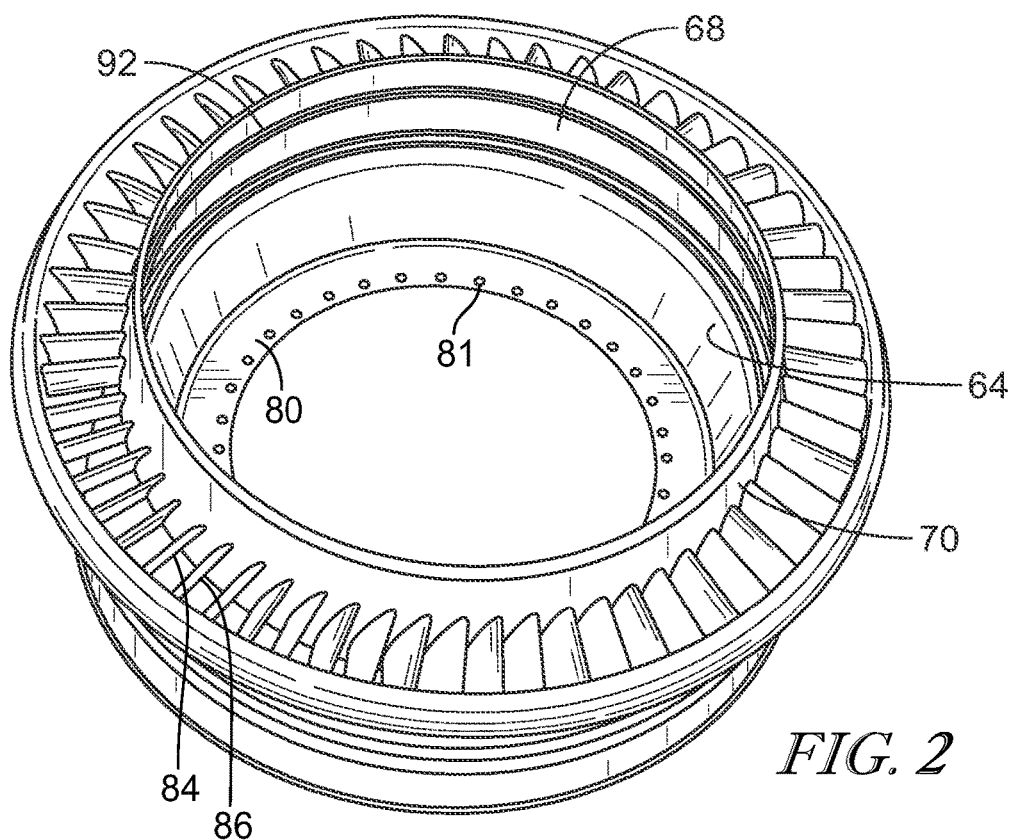
FIG. 2 is a front perspective view of an engine section stator adapted for use in the gas turbine engine of FIG. 1 showing stiffening features on inner and outer bands.
Figure 3:
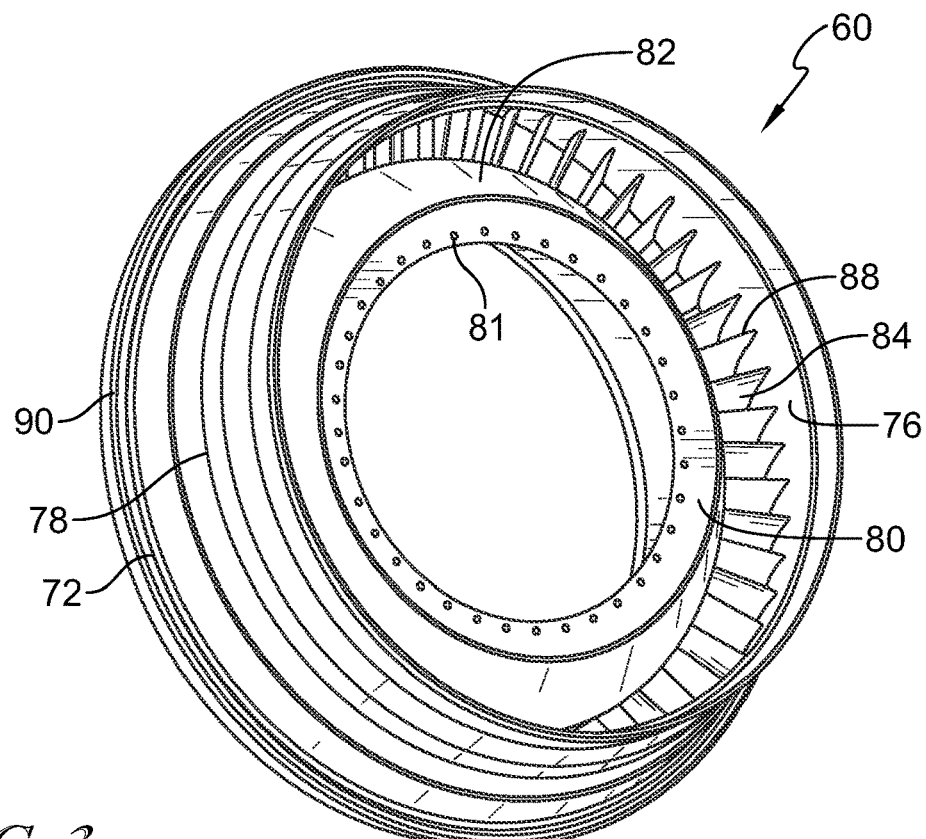
FIG. 3 is a rear perspective view of the engine section stator showing the stiffening feature on the outer band.
Figure 3A:
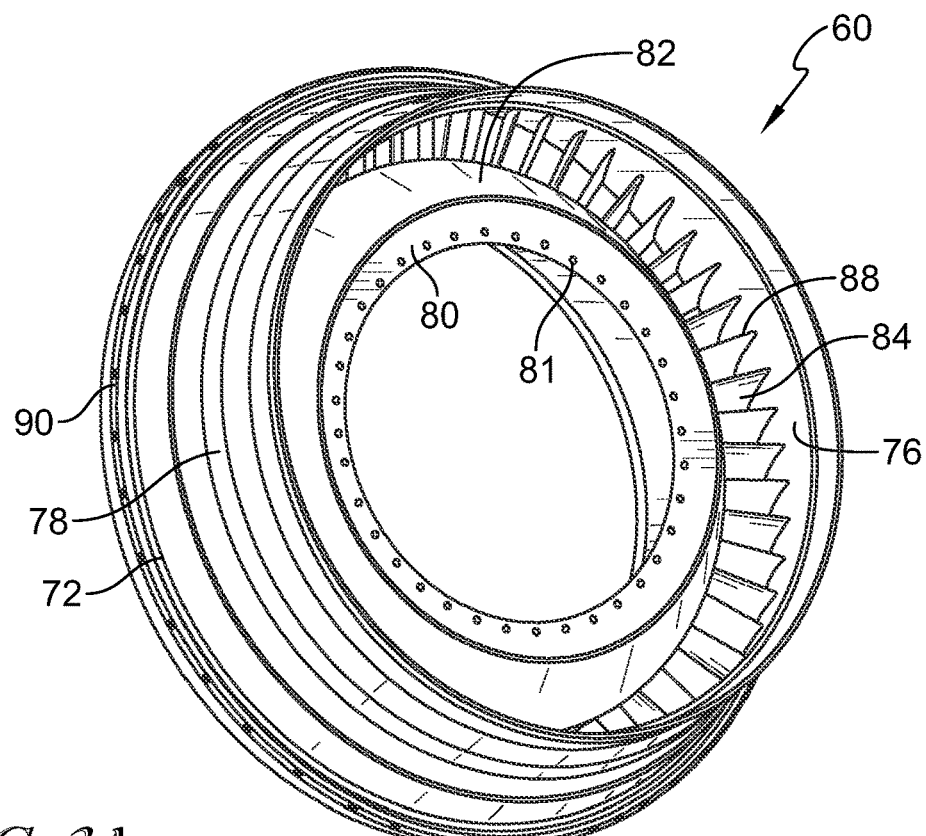
FIG. 3A is another rear perspective view of the engine section stator showing a segmented stiffness feature on the outer band.

Engine section stator 60, as shown, for example, in FIGS. 2-3A includes an inner band 64. Inner band 64 includes an inner surface 68 and an outer surface 70. Engine section stator 60 also includes an outer band 72 spaced radially outwardly from inner band 64 to form a passageway for core airflow C. Outer band 72 includes an inner surface 76 and an outer surface 78. Inner band 64 also includes a radially inward flange 80. Flange 80 is coupled to inner band 64 by curved transition wall 82. Flange 80 includes a series of apertures 81 that are used to secure engine section stator 60 to engine 20.

Engine section stator 60 also includes a series of spaced apart aerofoils 84 extending radially outward from outer surface 70 of the inner band 64 to inner surface 76 of outer band 72. Aerofoils 84 include a leading edge 86 and a spaced apart trailing edge 88. Aerofoils 84 can be angled to the direction of airflow through engine section stator 60, as illustrated in the figures.

Figure 4:
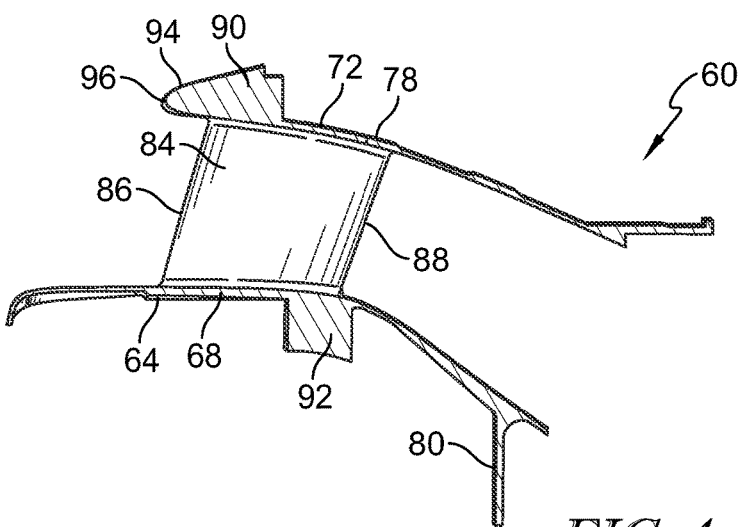
FIG. 4 is a sectional view of the engine section stator showing inner and outer bands separated by an aerofoil and further showing inner and outer stiffness features.

Engine section stator 60 includes a first stiffness feature 90, as shown in the representative cross section of FIG. 4. First stiffness feature 90 is part of outer band 72. First stiffness feature 90 is located proximate the leading edge 86 of aerofoils 84 and extends radially outwardly from outer surface 78 of the outer band 72. First stiffness feature 90 can be in the form of a hoop that extends completely around outer band 72 or can be in the form of segments wherein each segment is aligned with each aerofoil 84.

Engine section stator 60 also includes a second stiffness feature 92 in the illustrative embodiment, as shown in FIG. 4. Second stiffness feature 92 is part of inner band 64. Second stiffness feature 92 is illustratively located proximate trailing edge 88 of aerofoils 84 and extends radially inwardly from the inner surface 68 of the inner band 64. Second stiffness feature 92 can be in the form of a hoop that extends completely around inner band 64 or can be in the form of segments wherein each segment is aligned with each aerofoil 84. First and second stiffness features 90, 92 increase high cycle fatigue strength in aerofoils 84 without impeding airflow passing between the inner and outer bands 64, 72.

In other embodiments, engine section stator 60 includes one or more stiffness features only on the inner band 64, one or more stiffness features only on the outer band 70, or any combination and any number of stiffness features on both the inner band 64 and the outer band 70.

First stiffness feature 90 can be in the form of a splitter nose 94 located at a leading edge 96 of the outer band 72 as shown in FIG. 4, for example. Splitter nose 94 extends around the perimeter of the engine section stator 60 to form a full hoop ring. Splitter nose 94 may include solid portions proximate aerofoils 84 and hollow portions between aerofoils 84 or can be complete solid.

Figure 5:
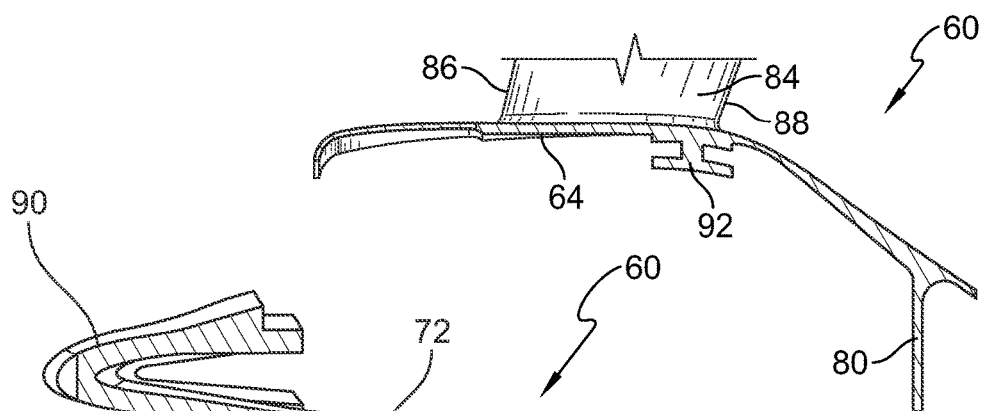
FIG. 5 is a sectional view of the engine section stator showing an inner band coupled to a vane and further showing an inner stiffness feature.
Figure 6:
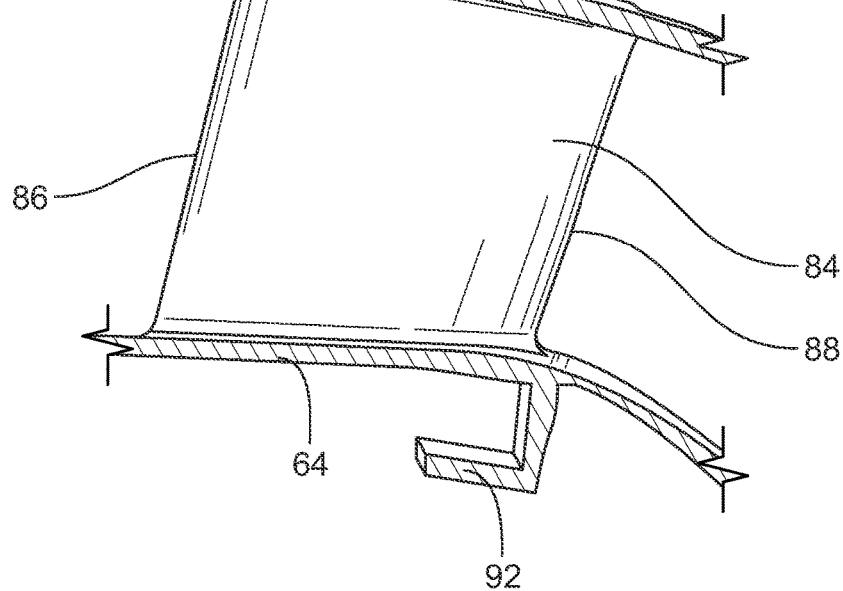
FIG. 6 is a sectional view of another engine section stator with inner and outer stiffness features.
Figure 7:
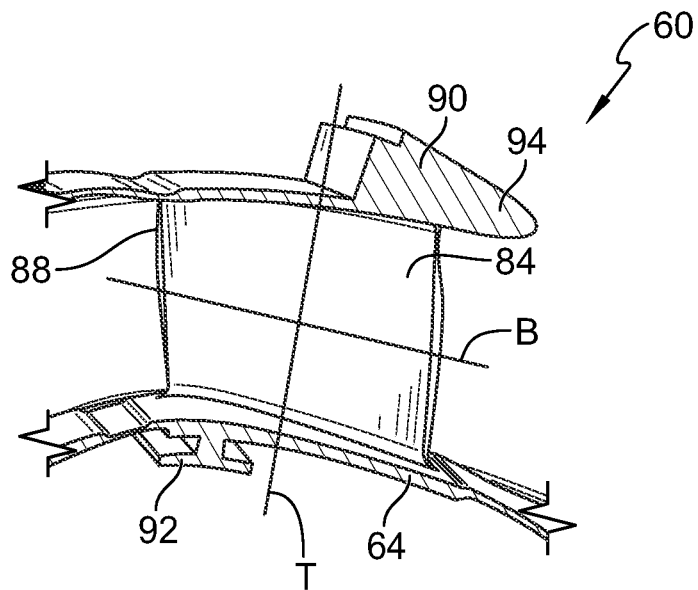
FIG. 7 is a sectional view of another engine section stator with inner and outer stiffness features.
Figure 8:
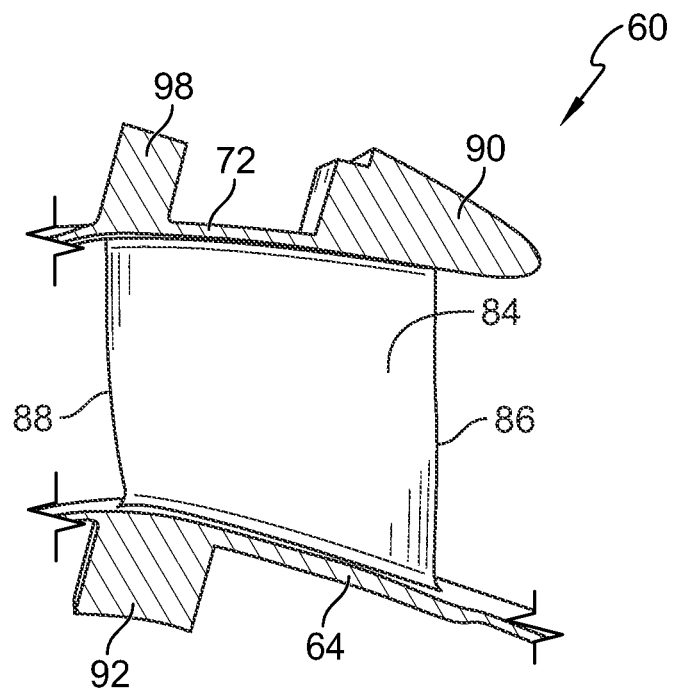
FIG. 8 is a sectional view of another engine section stator with the addition of a third beam member the outer band to enhance high cycle fatigue strength.
Figure 9:
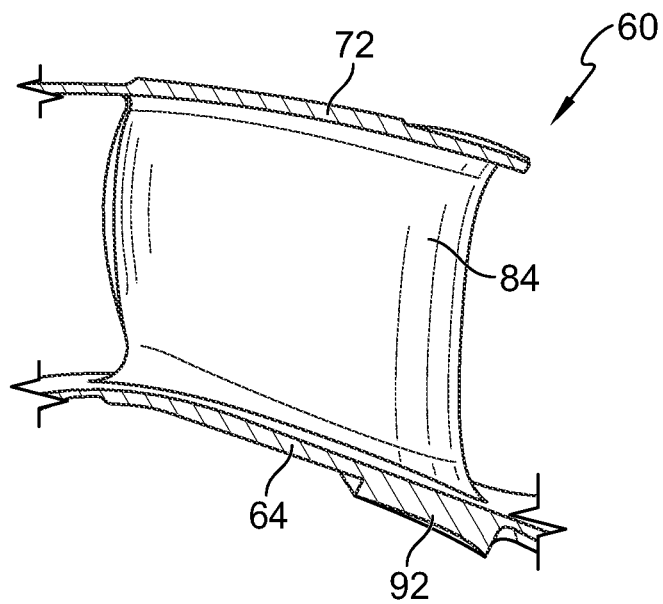
FIG. 9 is a sectional view of another engine section stator with an inner stiffness feature and illustrating stresses across the aerofoil.

Second stiffness feature 92 can be in the form of a parallelogram, in cross section, as shown in FIG. 4. More specifically, second stiffness feature 92 can have a rectangular or square cross section. Second stiffness feature 92 or can also have a T-shaped cross section, as shown in FIG. 5 or a C-shape cross section, as shown in FIG. 6, which is a modification of the T-shape cross section where one half of the horizontal portion of the T is removed. Use of the T-shaped or C-shaped cross section can increase hoop stiffness and reduce the overall weight of engine section stator 60. It is preferable that engine section stator 60 is manufactured from a single forging so that inner and outer bands 64, 72, aerofoils 84 and first and second stiffness features 90, 92 are unitary in construction.

By introducing stiffness features 90, 92 to engine section stator 60, and specifically to the non-aero surfaces of inner and outer bands 64, 72 proximate the leading edges 86 and trailing edges 88 (LE/TE), the high cycle fatigue endurance capability of aerofoils 84 is increased. Stiffness features 90, 92 trade with overall weight engine section stator 60 if not integrated into the structure that would have had to be there regardless, but does allow for more optimal aerodynamic definition to be utilized in the design than would otherwise be possible.

Typically, mechanical design and aerodynamic design trade off with each other to meet their desired goals with sometimes directly conflicting optimal parameters. The use of stiffness features 90, 92 does not affect the aerodynamic definition of the aerofoils so engine section stator 60 can be optimized to maximize HCF capability while attempting to maintain the desired weight margin. Stiffness features 90, 92 can be turned if axisymmetric for cost efficiency or milled in an additional operation if to be broken circumferentially. While the simplest configuration include full stiffness features 90, 92 in the form of hoop rings, designs for flight engines could include T-shaped beams or C-shaped beams which are segmented hoop-wise that return increased stiffness while only causing minimal weight addition.

Figure 2A:
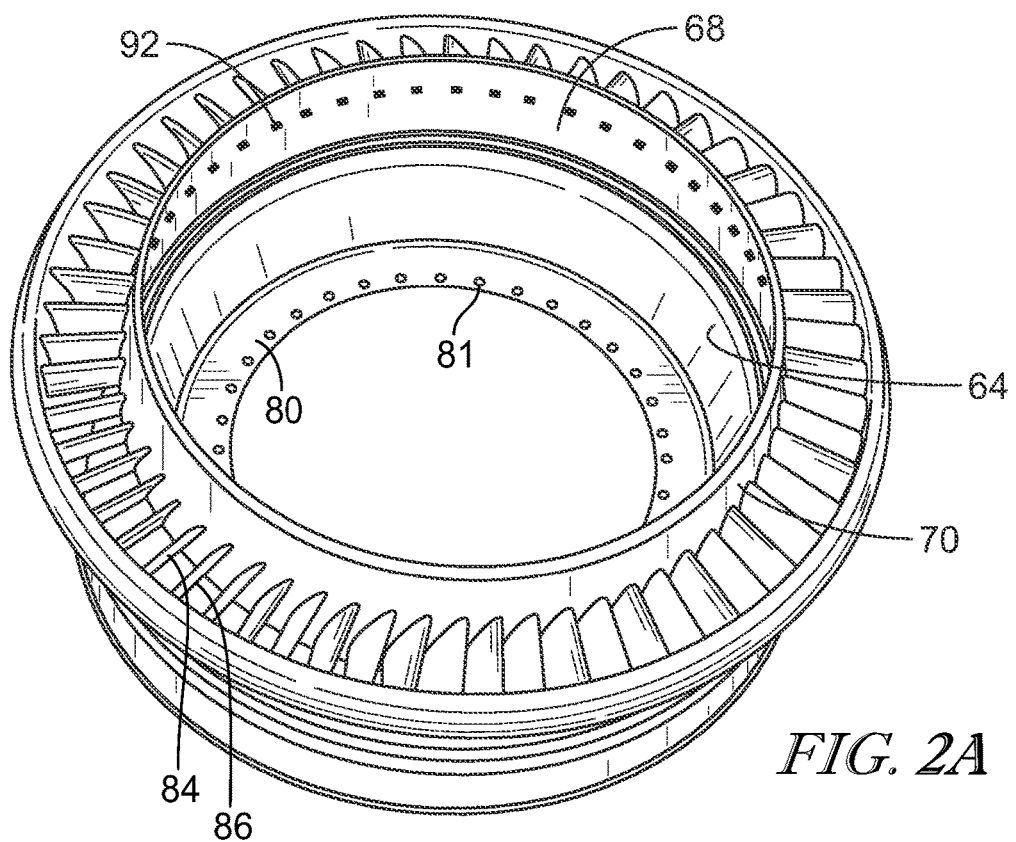
FIG. 2A is another front perspective view of the engine section stator showing a segmented stiffness feature on the inner band.

FIGS. 4-10 illustrate several configurations of stiffness features 90, 92. FIG. 4 illustrates the use of both stiffness features 90, 92 which improves HCF capability of aerofoils 84. Given a general aerofoil 84 shape (span, chord, camber, thicknesses) stiffness features 90, 92 can be tailored to improve HCF capability as desired, as shown, for example, in FIG. 4. That is, an aerofoil design that could not feasibly have adequate HCF may be possible with these stiffness features incorporated. Stiffness features 90, 92 could also be broken in hoop to only stiffen the circumference under trailing edge 88 of each aerofoil 84, as shown, for example, in FIGS. 2A, 3A.

Increasing second stiffness feature 92 of inner band 64 by three times (3×) the original thickness can reduce the stresses in aerofoil 84 significantly and provided adequate HCF strength, with a balance between modes. Further modification to inner and outer bands 64, 72 could provide more design space to be aggressive on the aerofoil definition for greater efficiency while still maintaining HCF endurance. Optimization using simulation routines can be used to create further improvements in HCF capability which then enable thinner aerofoils with small fillets, for example. Stiffness feature 92 may have a C-beam configuration or scalloped circumferentially to minimize weight, or the layout of the vane may modify the arrangement to provide more stiffness where 92 is located as part of the attachment to the intermediate case.

Figure 10:
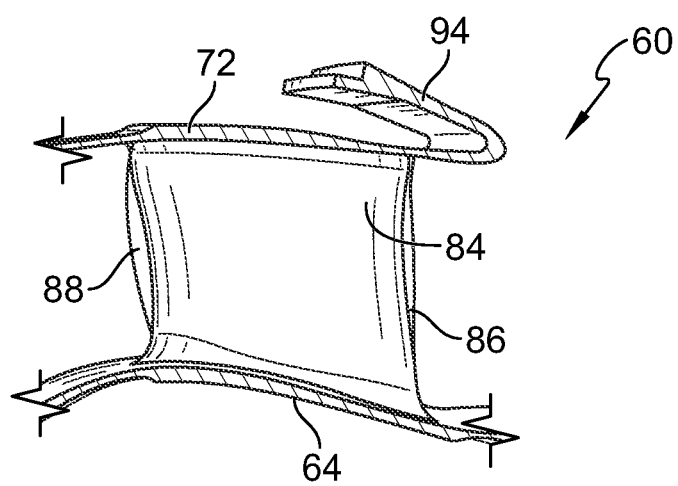
FIG. 10 is a sectional view of another engine section stator with a shelled splitter nose to provide stiffness and balance stress in the aerofoil.

A shelled or hollow splitter nose 94 provides stiffness and can balance stress, as shown, for example, in FIG. 10. Second stiffness feature 92 may help improve balance between competing modes that impose stress on an aerofoil.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An engine section stator for a gas turbine engine having a compressor, a combustor, and a turbine, the engine section stator comprising:
   an inner band that extends circumferentially at least partway about an axis, the inner band having an inner surface, an outer surface, and a flange that extends radially inwardly from the inner surface and secures the engine section stator to the gas turbine engine;
   an outer band spaced radially outwardly from the inner band, the outer band extending circumferentially at least partway about the axis, and the outer band having an inner surface and an outer surface; and
   a series of spaced apart aerofoils extending radially outward from the outer surface of the inner band to the inner surface of the outer band, the aerofoils having a leading edge and an axially spaced apart trailing edge;
   wherein the engine section stator includes a first stiffness feature located proximate the leading edge of each of the aerofoils and extending radially outwardly from the outer surface of the outer band;
   wherein the engine section stator includes a second stiffness feature axially aligned with the trailing edge of each of the aerofoils and extending radially inwardly from the inner surface of the inner band axially forward of the flange to increase high cycle fatigue strength of the aerofoils without impeding airflow passing between the inner and outer bands;
   wherein the first stiffness feature is in the form of a splitter nose at a leading edge of the outer band and the splitter nose defines a planar wall that extends radially outwardly from the outer surface of the outer band and spaced axially aft of the leading edge and axially forward of the trailing edge of each of the aerofoils; and
   wherein the second stiffness feature extends circumferentially around the outer band to form a full hoop ring.

2. The engine section stator of claim 1, wherein the splitter nose extends around the perimeter of the engine section stator to form a full hoop ring.

3. The engine section stator of claim 1, wherein the splitter nose includes solid portions proximate the aerofoils and hollow portions between the aerofoils.

4. The engine section stator of claim 1, wherein the second stiffness feature is parallelogram shaped in cross section.

5. The engine section stator of claim 1, wherein the second stiffness feature is T-shaped in cross section.

6. The engine section stator of claim 1, wherein the second stiffness feature is C-shaped in cross section.

7. The engine section stator of claim 1, wherein the inner and outer bands, aerofoils and first and second stiffness features are unitary in construction.

8. An engine section stator comprising:
   an inner band having an inner surface, an outer surface, and a flange that extends radially inwardly from the inner surface;
   an outer band spaced radially outwardly from the inner band relative to an axis, the outer band having an inner surface and an outer surface; and
   a series of spaced apart aerofoils extending radially outward from the outer surface of the inner band to the inner surface of the outer band, the aerofoils having a leading edge and a spaced apart trailing edge;
   wherein the engine section stator includes a stiffness feature axially aligned with the trailing edge of each of the aerofoils that extends radially away from one of the inner surface of the inner band axially forward of the flange; and
   wherein the engine section stator comprises a splitter nose at a leading edge of the outer band and the splitter nose defines a planar wall that extends radially outwardly from the outer surface of the outer band and spaced axially aft of the leading edge and axially forward of the trailing edge of each of the aerofoils.

9. The engine section stator of claim 8, wherein the stiffness feature is parallelogram shaped in cross section.

10. The engine section stator of claim 9, wherein the stiffness feature extends circumferentially around the outer band to form a full hoop ring.

11. The engine section stator of claim 9, wherein the stiffness feature is in the form of individual segments positioned at locations where the aerofoils are secured to the inner band.

12. The engine section stator of claim 8, wherein the stiffness feature is T-shaped in cross section.

13. The engine section stator of claim 8, wherein the stiffness feature is C-shaped in cross section.

14. The engine section stator of claim 8, wherein the inner and outer bands, aerofoils, and the stiffness feature are unitary in construction.

15. The engine section stator of claim 8, wherein the stiffness feature is a parallelogram in cross section.

16. The engine section stator of claim 15, wherein the stiffness feature and the splitter nose extend around the inner and outer bands to form full hoop rings.

17. An engine section stator comprising:
- an inner band having an inner surface, an outer surface, and a flange that extends radially inwardly from the inner surface;
- an outer band spaced radially outwardly from the inner band relative to an axis, the outer band having an inner surface and an outer surface; and
- a series of spaced apart aerofoils extending radially outward from the outer surface of the inner band to the inner surface of the outer band, the aerofoils having a leading edge and an axially spaced apart trailing edge;
- wherein the engine section stator includes a first stiffness feature located proximate the leading edge of each of the aerofoils and extending radially outwardly from the outer surface of the outer band;
- wherein the engine section stator includes a second stiffness feature located proximate one of the leading edge or the trailing edge of each of the aerofoils and extending radially inwardly from the inner surface of the inner band axially forward of the flange; and
- wherein the first stiffness feature is in the form of a splitter nose at a leading edge of the outer band and the splitter nose defines a planar wall that extends radially outwardly from the outer surface of the outer band and spaced axially aft of the leading edge and axially forward of the trailing edge of each of the aerofoils.

18. The engine section stator of claim 17, wherein the second stiffness feature extends circumferentially around the outer band to form a full hoop ring.

19. The engine section stator of claim 17, wherein the second stiffness feature is in the form of segments positioned at locations where the aerofoils are secured to the inner band.

* * * * *